United States Patent
Yao et al.

(10) Patent No.: US 11,749,795 B2
(45) Date of Patent: Sep. 5, 2023

(54) METHOD OF ACTIVATING TWO-DIMENSIONAL MATERIALS FOR MULTIVALENT/POLYATOMIC-ION INTERCALATION BATTERY ELECTRODES

(71) Applicant: University of Houston System, Houston, TX (US)

(72) Inventors: Yan Yao, Pearland, TX (US); Hyun Deog Yoo, Houston, TX (US)

(73) Assignee: University of Houston System, Houston, TX (US)

(*) Notice: Subject to any disclaimer, the term of this patent is extended or adjusted under 35 U.S.C. 154(b) by 106 days.

(21) Appl. No.: 17/179,687

(22) Filed: Feb. 19, 2021

(65) Prior Publication Data
US 2021/0210742 A1    Jul. 8, 2021

Related U.S. Application Data

(62) Division of application No. 15/735,423, filed as application No. PCT/US2016/038311 on Jun. 20, 2016, now abandoned.

(60) Provisional application No. 62/181,873, filed on Jun. 19, 2015.

(51) Int. Cl.
| | |
|---|---|
| H01M 4/04 | (2006.01) |
| H01M 4/13 | (2010.01) |
| H01M 4/139 | (2010.01) |
| H01M 4/136 | (2010.01) |
| H01M 4/1397 | (2010.01) |

(Continued)

(52) U.S. Cl.
CPC .......... *H01M 4/0445* (2013.01); *H01M 4/13* (2013.01); *H01M 4/136* (2013.01); *H01M 4/139* (2013.01); *H01M 4/1397* (2013.01); *H01M 4/5815* (2013.01); *H01M 10/054* (2013.01)

(58) Field of Classification Search
CPC ...... H01M 4/0445; H01M 4/13; H01M 4/136; H01M 4/139; H01M 4/1397; H01M 4/5815; H01M 10/54
See application file for complete search history.

(56) References Cited

U.S. PATENT DOCUMENTS

| | | | | |
|---|---|---|---|---|
| 4,487,922 A | * | 12/1984 | Dines | ..... B01J 31/185 987/300 |
| 2002/0182495 A1 | * | 12/2002 | Ogura | ..... H01M 4/02 429/232 |

(Continued)

OTHER PUBLICATIONS

Novak, et al., Journal of the Electrochemical Society, 1993, vol. 140, pp. 140-144 (Year: 1993).*

(Continued)

*Primary Examiner* — Sadie White
(74) *Attorney, Agent, or Firm* — Shackelford, Bowen, McKinley & Norton, LLP

(57) ABSTRACT

A method for activating two-dimensional host materials for a multivalent/polyatomic ion battery may include adding a pillaring salt in electrolyte. This process may be followed by in-situ electrochemically intercalating the pillaring ions, solvent molecules and multivalent ions into the van der Waals gap of host materials. After the activation process, the host material is transformed into an interlayer-expanded 2D material with significantly enhanced specific capacity and rate performance for multivalent ion intercalation.

17 Claims, 11 Drawing Sheets

(51) Int. Cl.
    *H01M 4/58*     (2010.01)
    *H01M 10/054*     (2010.01)

(56) References Cited

U.S. PATENT DOCUMENTS

| | | | | |
|---|---|---|---|---|
| 2012/0219859 A1* | 8/2012 | Doe | C01B 25/42 | 429/219 |
| 2013/0252112 A1* | 9/2013 | Doe | H01M 10/0568 | 429/328 |
| 2013/0260225 A1* | 10/2013 | Doe | H01M 4/366 | 429/188 |
| 2014/0220450 A1* | 8/2014 | Jilek | C25D 3/42 | 429/188 |

OTHER PUBLICATIONS

Lerf, et al., Inorganic Chemistry, 1977, vol. 16, No. 11, pp. 2950-2956 (Year: 1977).*
Wu, et al., Chemistry: An Asian Journal, 2014, vol. 9, pp. 2099-2102 (Year: 2014).*
Dong, et al. (Nano Energy, 2015, 15, 145-152) (Year: 2015).*
Besenhard, et al. (Journal of Power Sources, 54, 1995, 228-231) (Year: 1995).*
Ohashi, et al. (Bull. Chem. Soc. Japan, 1991, 64, 2814-2818) (Year: 1991).*
Yoo et al., Mg rechargeable batteries: an on-going challenge, Energy Environ. Sci., 2013, 6, 2265.

* cited by examiner

METHOD OF ACTIVATING TWO-DIMENSIONAL MATERIALS FOR MULTIVALENT/POLYATOMIC-ION INTERCALATION BATTERY ELECTRODES

RELATED APPLICATIONS

This application claims the benefit of U.S. Provisional patent application Ser. No. 15/735,423 filed Dec. 11, 2017, which claims priority to International Application No. PCT/US2016/038311 filed on Jun. 20, 2016, which claims priority to U.S. Provisional Patent Application No. 62/181,873 filed on Jun. 19, 2015, which are all incorporated herein by reference.

STATEMENT REGARDING FEDERALLY SPONSORED RESEARCH

This invention was made with government support under Grant No. N00014-13-1-0543 awarded by the Office of Naval Research. The government has certain rights in the invention.

FIELD OF THE INVENTION

This invention relates to multivalent/polyatomic-ion batteries. More particularly, to a method for activating two-dimensional materials as high-capacity and high-rate intercalation electrodes in such batteries.

BACKGROUND OF INVENTION

The first rechargeable magnesium battery was proposed in as early as 2000, which delivered an energy density only comparable to Ni—Cd batteries. Surprisingly, this material still represents one of the most successful cathode materials for rechargeable magnesium batteries after more than ten years of R&D in this field. For aluminum, only $V_2O_5$ and $TiO_2$ have been attempted as cathodes, neither of which exhibited practical energy density. These results reflect the intrinsic difficulty of electrochemical storage of multivalent cations in insertion compounds. Compared to monovalent cations, multivalent metal cations are characterized by small ion radii and high charge number. These characteristics indicate the high polarization strength of multivalent cation, and result in strong electronic interaction between the cations and the negatively charged coordinating atoms in the insertion host, which in turn leads to unfavorable insertion and diffusion. The insertion/diffusion of these cations are sluggish in common frameworks that work well for lithium.

During the past decade, a wide range of insertion compounds have been screened for magnesium storage, including layered transition metal chalcogenides, transition metal oxides, and mesoporous polyanionic magnesium salts ($Mg_{1.03}Mn_{0.97}SiO_4$, $MgCoSiO_4$ with discharge voltage at 1.65 V). For oxides, no practical cycling stability has been reported.

Only cheveral phases (CPs, $Mg_xMo_6S_{8-y}Se_y$ (y=0, 1, 2)) have exhibited practical magnesium insertion at a 1.1-1.3 V vs. $Mg/Mg^{2+}$. To date, there is no cathode material exhibiting practical energy density and cyclability suitable for electrochemical storage of multivalent metal ions. In particular, there has been no demonstration of an Mg ion full cell with higher than 2V voltage, which includes an Mg insertion cathode, an Mg anode and a compatible electrolyte.

Methods for activating two-dimensional materials as high-capacity and high-rate intercalation electrodes in batteries are discussed herein.

SUMMARY OF INVENTION

In one embodiment, a method for activating two-dimensional host materials for a multivalent/polyatomic ion battery may include adding a pillaring salt in electrolyte. This process may be followed by in-situ electrochemically intercalating the pillaring ions, solvent molecules and multivalent/polyatomic ions into the van der Waals gap of host materials. After the activation process, the host material is transformed into an interlayer-expanded 2D material with significantly enhanced specific capacity and rate performance for multivalent/polyatomic ion intercalation. Using this method, the interlayer spacing of 2D material relative to a pristine sample may be 50% larger or more. In comparison, pervious methods only increase the spacing less than 10%.

In some embodiments, an electrode for a multivalent/polyatomic ion battery may be formed from two-dimensional host materials that have been activated. The van der Waals gap of the host material may be intercalated with pillaring ions and multivalent/polyatomic ions. In a discharged stage, van der Waals gaps of the host material may be substantially filled with the pillaring ions and multivalent/polyatomic ions. In a charged stage, the multivalent/polyatomic ions are de-intercalated from the host material, but the pillaring ions may remain. Further, an interlayer spacing of the host material does not change during a charged stage and discharged stage.

In one embodiment, polyatomic $MgCl^+$ is identified as the Mg storage carrier, which allows for a significantly reduced diffusion barrier (in comparison to $Mg^{2+}$) to realize high specific capacity and charge-discharge rates.

The foregoing has outlined rather broadly various features of the present disclosure in order that the detailed description that follows may be better understood. Additional features and advantages of the disclosure will be described hereinafter.

BRIEF DESCRIPTION OF THE DRAWINGS

For a more complete understanding of the present disclosure, and the advantages thereof, reference is now made to the following descriptions to be taken in conjunction with the accompanying drawings describing specific embodiments of the disclosure, wherein.

DETAILED DESCRIPTION

Figure 1:
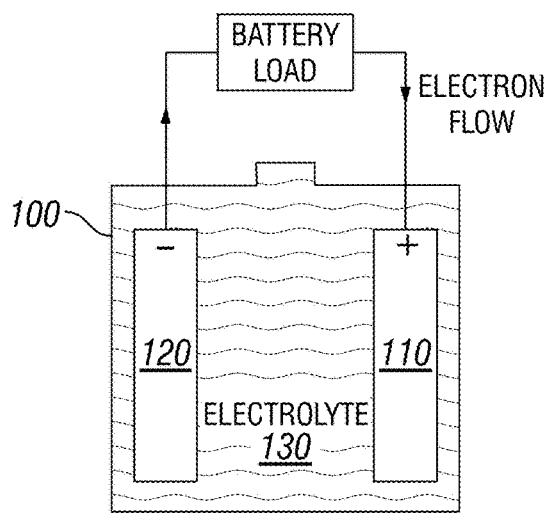
FIG. 1 shows an illustrative structure of a multivalent/polyatomic-ion battery.

Refer now to the drawings wherein depicted elements are not necessarily shown to scale and wherein like or similar elements are designated by the same reference numeral through the several views.

Referring to the drawings in general, it will be understood that the illustrations are for the purpose of describing particular implementations of the disclosure and are not intended to be limiting thereto. While most of the terms used herein will be recognizable to those of ordinary skill in the art, it should be understood that when not explicitly defined, terms should be interpreted as adopting a meaning presently accepted by those of ordinary skill in the art.

It is to be understood that both the foregoing general description and the following detailed description are exemplary and explanatory only, and are not restrictive of the invention, as claimed. In this application, the use of the singular includes the plural, the word "a" or "an" means "at least one", and the use of "or" means "and/or", unless specifically stated otherwise. Furthermore, the use of the term "including", as well as other forms, such as "includes" and "included", is not limiting. Also, terms such as "element" or "component" encompass both elements or components comprising one unit and elements or components that comprise more than one unit unless specifically stated otherwise.

Developing high energy, high power, and safe batteries is of great significance to address the society's energy needs, such as distributed power sources, electric vehicles, and devices that handle large amounts of power. Among existing battery technologies, rechargeable lithium batteries theoretically possess the highest gravimetric energy density because the small formula weight of lithium and the unbeatable 3861 mAh $g^{-1}$ specific capacity. However, metallic lithium anode cannot be directly used because they form dendritic and mossy metal deposits during repeated charge and discharge cycles, leading to serious safety concerns. Alternative insertion compounds (e.g. graphite and $Li_4Ti_5O_{12}$) result in a significant drop in energy density—both gravimetrically and volumetrically (see Table 1). Magnesium rechargeable batteries (MRBs) have recently emerged as an attractive alternative candidate for future energy storage in terms of safety, energy density, and scalability.

TABLE 1

Key parameters comparison of lithium, magnesium, and aluminum.

| | Lithium | Magnesium | Aluminum |
|---|---|---|---|
| Gravimetric Capacity (mAh $g^{-1}$) | 3861 (Li metal) 372 (graphite) | 2205 (Mg metal) | 2980 (Al metal) |
| Volumetric Capacity (mAh $cm^{-3}$) | 2066 (Li metal) 837 (graphite) | 3833 (Mg metal) | 8046 (Al metal) |
| Potential (V vs NHE) | -3.04 (Li metal) -2.9 (graphite) -1.49 ($Li_4Ti_5O_{12}$) | -2.37 (Mg metal) | -1.66 (Al metal) |
| Global Production (kg $yr^{-1}$) | 2.5 * $10^7$ (very low) | 6.3 * $10^9$ (high) | 4.0 * $10^{10}$ (high) |
| $M^{n+}$ Radius (Å) | 0.68 | 0.65 | 0.50 |
| Polarization Strength ($10^5$/$pm^{-2}$) | 21.6 | 47.3 | 120 |

Alternatively, electrodes based on light-weight multivalent metals with densities of 1.7-2.7 g/$cm^3$ such as magnesium and aluminum offer up to seven times higher volumetric specific capacity than lithium-ion battery anodes. In addition, their redox potentials are 0.7-1.4 V higher than lithium, implying potentially better safety; but not too high (e.g. the redox potential of aluminum is lower than the popular anode $Li_4Ti_5O_{12}$) so that the theoretically achievable working potential is not compromised. More interestingly, studies on the electrochemical deposition of magnesium showed that magnesium can be plated in a uniform dendrite-free manner and will serve as a safe anode material. Rechargeable magnesium batteries are therefore regarded as a potentially low-cost, ultra-high energy, and safe technology for energy storage.

However, the development of practical MRBs remains hindered largely due to the limited choices of Mg-intercalation cathodes. The high dissociation energy to break the Mg—Cl bond of electro-active species in an Mg electrolyte and the sluggish solid-state $Mg^{2+}$ diffusion are considered as key challenges. The development of Mg-ion intercalating cathodes has proved particularly challenging because of the relatively higher energy barrier for $Mg^{2+}$ migration in host materials, typically larger than 0.7 eV. For this reason, most Mg-ion cathodes studied so far show poor performance. For example, layered titanium disulphide ($TiS_2$), a classic Li-ion intercalation host with 220 mAh $g^{-1}$ of reversible capacity, demonstrates merely 20 mAh $g^{-1}$ capacity when used as a Mg-ion cathode. The difference in terms of capacity can be understood when comparing the migration energy barriers for two diffusion species, 1.2 eV for $Mg^{2+}$ (ref. 24) vs. 0.38 eV for Li$^+$ (ref. 25). Two general approaches were developed in the past to reduce the barrier: nanosizing cathode particles and introducing dipole molecules (e.g., H$_2$O) in cathode or electrolyte. Both approaches are effective in boosting capacity to certain extent, but also come with issues such as lower volumetric density and incompatibility with Mg metal anode. Therefore, it is highly desirable to have an alternative approach for the development of MRBs towards high energy and power densities as well as good cycling stability.

The development of Mg-ion intercalating cathodes is also hindered by the Mg desolvation and intercalation process at the electrolyte-cathode interface. Among the popular Mg-depositing electrolytes such as the dichloro complex (DCC), all-phenyl complex (APC), and magnesium aluminium chloride complex (MACC), the consensus is that the monovalent Mg$_x$Cl$_y^+$·nTHF specie is the electro-active component. Although the dimer, Mg$_2$Cl$_3^+$, has long been considered as the dominated specie supported from the recrystallization of electrolytes, the grand-potential phase diagram for the Mg—Cl-THF system was recently calculated and clarified MgCl$^+$·3THF and MgCl$_2$·2THF as the most stable species and a complex dynamic equilibria exist among MgCl$^+$, AlCl$_4^-$, MgCl$_2$ and AlCl$_3$ species. Mass spectrometry study also supports the finding. Furthermore, in order to enable Mg$^{2+}$ intercalation in cathode, one has to break the Mg—Cl bond of the electro-active species first. The dissociation energy of Mg—Cl bond in a coordinated complex is calculated to exceed 3 eV using density functional theory, which presents the second challenge for Mg$^{2+}$ intercalating cathode development.

To overcome the challenges outlined above for an efficient Mg$^{2+}$ intercalating cathode, research has been conducted on potentially viable MRB designs that are also applicable to other layered host materials. Systems and methods for activating two-dimensional host materials to expand the van der Waals gap of the host materials, such as with pillaring ions, are discussed herein.

As a nonlimiting example, research discussed herein showed an MRB that is based on a monovalent MgCl$^+$ storage mechanism that would enable very low migration energy barrier, no need to break Mg—Cl bond at the cathode, and maintain the dendrite-free Mg-metal deposition at the anode can be provided. The cathode involves MgCl$^+$ intercalation or coordination, the electrolyte contains MgCl$^+$ species, and the anode magnesium deposition and stripping involves MgCl$^+$. A MgCl$^+$ based intercalation cathode has never been reported previously because the size of MgCl$^+$ is so large that the conventional intercalation approach is inefficient. In this work, two-dimensional TiS$_2$ is expanded to an unusually large value of 1.86 nm (327% as large as the pristine form) to accommodate the intercalation of large MgCl$^+$. During discharge, MgCl$^+$ ions are intercalated into a cathode while being simultaneously regenerated at the Mg anode enabled by the dynamic equilibrium among electro-active species in Mg electrolyte. It was demonstrated that a MRB with a high reversible capacity of 270 mAh g$^{-1}$ and an excellent cycling stability for 500 cycles with 80% capacity retention can be produced. The new storage mechanism can be extended to a wide range of multivalent/polyatomic ion batteries (e.g. Ca$^{2+}$, Al$^{3+}$) and two-dimensional materials, highlighting the importance of an unexploited new route of materials design in multivalent ion energy storage. A combination of theoretical modelling, in-operando spectroscopic, and electrochemical study confirms the MgCl$^+$ intercalation mechanism. This research opens up new possibilities for a variety of low-cost multivalent/polyatomic ion batteries.

FIG. 1 illustrates an arrangement for a multivalent/polyatomic ion battery (MIB) 100. The MIB 100 may provide positive 110 and negative 120 electrodes in an electrolyte 130. It shall be understood that the electrode(s) may be formed of a layered electrode material that allows for intercalation. The positive electrode 110 may be formed from any layered-structure materials. In some embodiments, the layered-structure materials may be selected from those listed in table 2. The negative electrode 120 may be Mg, Ca, or Al metal. The electrolyte 130 may be any suitable nonaqueous electrolyte with the proposed pillaring salt discussed herein. In some embodiments, suitable nonaqueous electrolytes may include phenyl complex (APC), MgCl$_2$—AlCl$_3$/diglyme, MgCl$_2$—Mg(TFSI)$_2$/DME, or Mg(CB$_{11}$H$_{12}$)$_2$/tetraglyme. In some embodiments, the chemical formula for pillaring salt is LX. The pillaring salt may be selected from chemically stable options and may also be soluble in an electrolyte form pillaring ions, such as L$^+$ or X$^-$. Whether L$^+$ or X$^-$ is utilized as the pillaring ion will depend on the host material to be intercalated. The pillaring ions L$^+$ or X$^-$ have a size suitable to expand layers of the host material to a desirable level. Nonlimiting examples of the pillaring ion L$^+$ may include imidazolium, pyridinium, ferrocenium, alkyl-ammonium, pyrrolidinium, and/or piperridinium. Nonlimiting examples of X$^-$ could include Cl$^-$, bis(trifluoromethane)sulfonimide or TFSI$^-$, BF$_4^-$, and/or AlCl$_x$R$_{4-x}^-$ (R=organic ligand such as alkyl, aryl, or alkoxide group).

In some embodiments, an active ion for charging/discharging stages may be a multivalent ion or polyatomic ion. In some embodiments, the multivalent ions or the polyatomic ions comprise a multivalent metal. The multivalent metal may be a metal with a high gravimetric/volumetric capacity, such as, but not limited to 120 mAh/g or greater. In some embodiments, the suitable multivalent ion includes Mg$^{2+}$, Ca$^{2+}$, Zn$^{2+}$, or Al$^{3+}$. In some embodiments, suitable polyatomic ions may be formed from the multivalent ions, such as, but not limited to, MgCl$^+$, Mg$_2$Cl$_3^+$, Mg$_2$Cl$_2^{2+}$, and AlCl$_4$. Nonlimiting examples of the host materials are provided in table 2 below. In some embodiments, the host material or layered material may be selected from elementals, metals, chalcogenides, metal oxides, oxy-halides, hydroxides, titanates, metal phosphates, phosphonates, or the like. Nonlimiting examples of suitable elementals include graphite and black-phosphorous. Nonlimiting examples of suitable metals may include any metal satisfying the formula MX$_2$ (where M=Ti, Mo, V, W, Nb, Ta, Zr, or Hf; and X=S or Se). Nonlimiting examples of suitable chalcogenides may include any chalcogenides satisfying the formula (MS)$_{1+x}$(TS$_2$)$_2$ (0≤x≤1)(where M=Sn or Pb; and T=Ti, Nb or Ta). Further examples of suitable chalcogenides may include any chalcogenides satisfying the formula MPX$_3$ (where M=Mg, V, Mn, Fe, Co, Ni, Zn, Cd or In; and X=S or Se). Additional examples of suitable chalcogenides may include any chalcogenides satisfying the formula AMS$_2$ (A=Li, Na, K, Rb, Cs, or Fr; M=Ti, V, Cr, Mn, Fe, Co, or Ni). Nonlimiting examples of suitable metal oxides may include any metal oxides satisfying the formula M$_x$O$_y$ (such as V$_2$O$_5$, MoO$_3$, Mo$_{18}$O$_{52}$, LiNbO$_2$, Li$_x$V$_3$O$_8$, where M=is a metal or a metal and combination of metals that includes an alkali metal, and x or y are values determined by oxidation states of the element(s) of M). Further examples of suitable metal oxides may include any metal oxides satisfying the formula MOXO$_4$ (where M=Ti, V, Cr, or Fe; and X=P or As). Nonlimiting examples of suitable oxy-halides may include any oxy-halides satisfying the formula MOX (where M=Ti, V, Cr, or Fe; and X=Cl or Br). Nonlimiting examples of suitable hydroxides may include Ni(OH)$_2$ or Mn(OH)$_2$. Nonlimiting examples of suitable titanates may include K$_2$Ti$_4$O$_9$ or KTiNbO$_5$. Nonlimiting examples of suitable metal phosphates may include any metal phosphates satisfying the formula M(HPO$_4$)$_2$ (where M=Ti, Zr, Ce, or Sn). Nonlimiting examples of suitable phosphonates may include any phosphonates satisfying the formula Zr(O$_3$PR$_2$)$_2$ (where R=H, Ph, or Me).

TABLE 2

Candidates for the layered materials

| Lattice Type | Illustrative Nonlimiting Examples |
| --- | --- |
| Elemental | Graphite, Black-Phosphorous |
| Metal chalcogenides | MX$_2$ (M = Ti, Mo, V, W, Nb, Ta, Zr, Hf; X = S, Se) (MS)$_{1+x}$(TS$_2$)$_2$ (0 < x < 1)(M = Sn, Pb; T = Ti, Nb, Ta) MPX$_3$ (M = Mg, V, Mn, Fe, Co, Ni, Zn, Cd, In; X = S, Se) AMS$_2$ (A = Group 1A Alkali metal; M = Ti, V, Cr, Mn, Fe, Co, Ni) |
| Metal Oxides | M$_x$O$_y$ (M = a metal or combination of metals, e.g. V$_2$O$_5$, MoO$_3$, Mo$_{18}$O$_{52}$, LiNbO$_2$, Li$_x$V$_3$O$_8$) MOXO$_4$ (M = Ti, V, Cr, Fe; X = P, As) |
| Oxy-Halides | MOX (M = Ti, V, Cr, Fe; X = Cl, Br) |
| Hydroxide | Ni(OH)$_2$, Mn(OH)$_2$ |
| Titanates | K$_2$Ti$_4$O$_9$, KTiNbO$_5$ |
| Metal Phosphates | M(HPO$_4$)$_2$ (M = Ti, Zr, Ce, Sn) |
| and Phosphonates | Zr(O$_3$PR$_2$)$_2$ (R = H, Ph, Me) |

The chemical formula for pillaring salt is LX. Nonlimiting examples of L$^+$ may include imidazolium, pyridinium, ferrocenium, alkyl-ammonium, pyrrolidinium, and/or piperridinium. Nonlimiting examples of X$^-$ could include Cl$^-$, TFSI$^-$, BF$_4^-$, and/or AlCl$_x$R$_{4-x}^-$.

Methods for activating two-dimensional host materials may include adding a pillaring salt in electrolyte, which may be selected from the various options discussed previously. In some embodiments, this process may be followed by chemically or electrochemically intercalating the pillaring ions, solvent molecules and multivalent/polyatomic ions into the van der Waals gap of host materials in-situ or ex-situ. The intercalating process may include placing the host material in the pillaring salt and the electrolyte mixture. Optional considerations for selecting pillaring salts include, but are not limited to, the size of the pillaring ion that can expand the layer to a desirable distance, the degree of chemical stability, and the compatibility with the host material and the electrolyte mixture. In some embodiments, the intercalation may occur chemically, such as by exposing the host material to a solution with the pillaring salts. In other embodiments, the intercalation may occur electrochemically by applying current to the host material in electrolyte mixtures or by combinations of both chemical and electrochemical routes. The intercalation process may progress through multiple stages as the separation distance between layers grows. In a first stage, pillaring ions and/or solvent molecules may expand the van der Waals gap of the host materials. In some embodiments, reversible intercalation of multivalent/polyatomic ions may occur in stage 1 to a certain level. In a second stage, as the pillaring ions and/or solvent molecules continue to expand the gap or separation distance between the layers, eventually the gap becomes large enough that multivalent/polyatomic ions begin to fill the van der Waals gap of the host materials as well. Reversible intercalation of multivalent/polyatomic ions may occur or continue to occur in stage 2 to a certain level. In a third stage, the process continues until activation is considered complete, such as when a maximum amount of multivalent/polyatomic ions fill the gaps of the host material. In some embodiments, these processes are followed by a significant change in the structure (for example, but not limited to, structural expansion or disordering) or the chemical composition (e.g., but not limited to, ratio of solvent to pillaring molecules) of host materials. These changes can be used as parameters to determine the optimal condition for activating two-dimensional host materials. The fourth stage represents a charging process where the multivalent/polyatomic ions are deintercalated from the gap to leave the pillaring ions and/or solvent molecules. Notably, once expanded, the interlayer distance does not decrease during the transition from the third stage to the fourth stage. During charging and discharging, the host material cycles between stages three and four.

In some embodiments, the pillaring ions, solvent molecules, and/or multivalent/polyatomic ions may be formed chemically without electrical stimulation from mixing the pillaring salt, electrolyte, and/or metal material(s). In other embodiments involving electrochemical intercalation, the host material is utilized as the working electrode during electrochemical activation and a counter and/or reference electrodes may also be place in the electrolyte mixture. The counter and/or reference electrode(s) may be formed from a metal constituent that is part of the multivalent ion that intercalates the host material. The application of a voltage differential to the working and counter electrodes may cause or accelerate formation of the pillaring ions, solvent molecules, and/or multivalent ions. Further, the application of the voltage differential may also cause or aid acceleration of the pillaring ions, solvent molecules, and/or multivalent ions into the host materials. After the activation process with or without electric stimulation, the host material is transformed into an interlayer-expanded 2D material with significantly enhanced specific capacity and rate performance for multivalent/polyatomic ion intercalation. The host material retains the increase separation distance between the layers, even when cycling between charge/discharge states.

An electrode for a multivalent/polyatomic ion battery may be formed from two-dimensional host materials that have been activated, such as by the methods discussed. In particular, the van der Waals gap of the host material may be intercalated with pillaring ions, solvent molecules and polyatomic or multivalent ions. In a discharged stage (e.g. third stage), van der Waals gaps of the host material may be substantially filled with the pillaring ions, solvent molecules and polyatomic or multivalent ions. In a charged stage (e.g. fourth stage), the polyatomic or multivalent ions are denintercalated from the host material, but the pillaring ions and solvent molecules may remain. Further, an interlayer spacing of the host material does not change during a charged stage and discharged stage.

Figure 2:
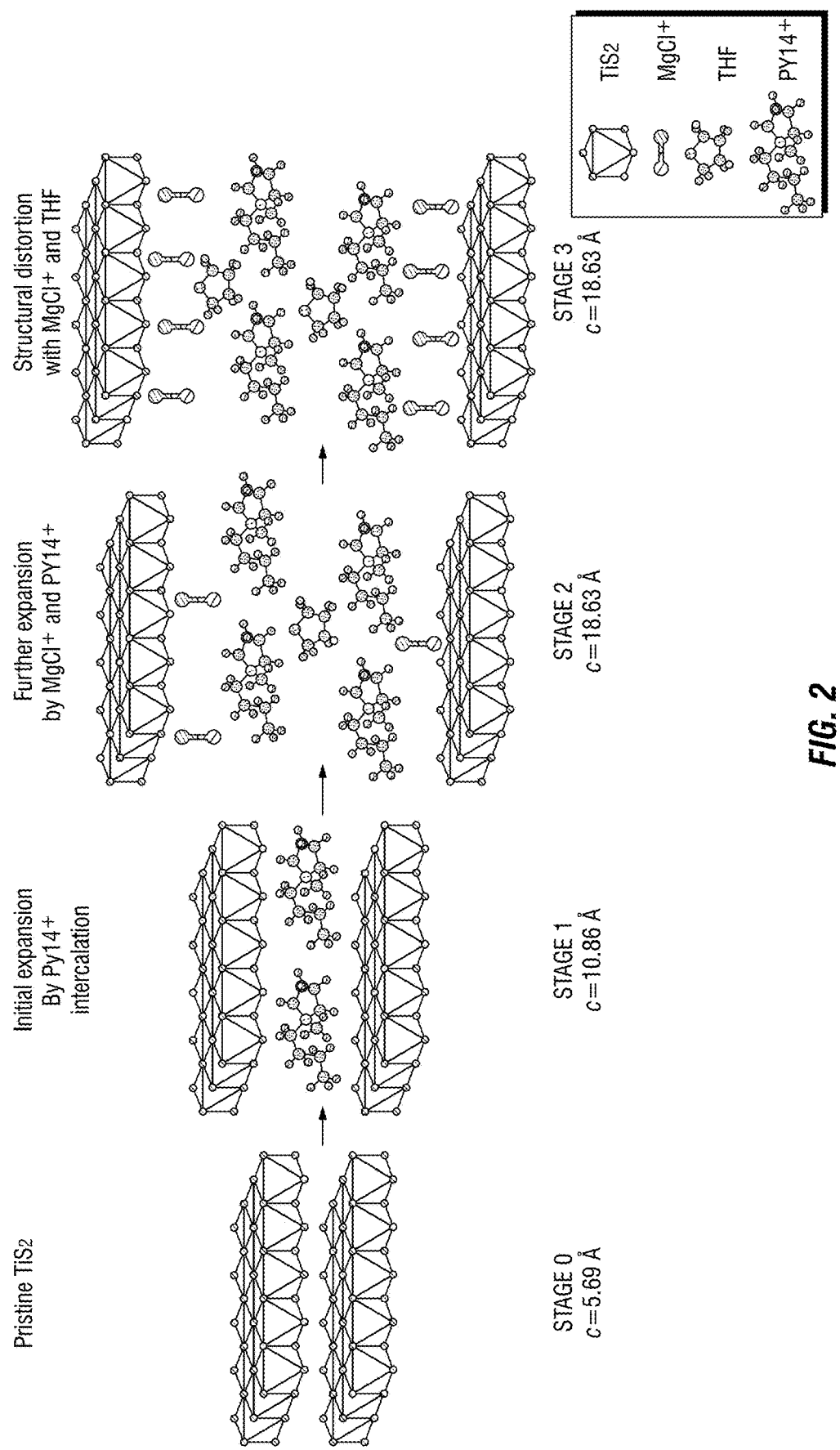
FIG. 2 shows the in-situ activation process of layered materials at various state of charge.

FIG. 2 shows an illustrative example of the in-situ activation process of layered materials at various states of activation. While TiS$_2$ is used as a nonlimiting model compound of the host material to illustrate the structural change during activation due to its high electronic conductivity, it shall be understood that similar structural changes may occur in the other embodiments discussed previously. Stage 0 is the host material (e.g. TiS$_2$) in its pristine form. A pillaring salt (e.g. PY14Cl) and electrolyte (e.g. APC) may be mixed. In stage 1 when current is applied to the host material that is exposed to the pillaring salt and electrolyte mixture, both pillaring ions (e.g. PY14$^+$) and/or solvents may be intercalated into the van der Waals gap, expanding the interlayer spacing of the host. In some embodiments, layered materials of stage 1 may be subjected to activation at low current density for a predetermined amount of time corresponding to the first stage change. As a nonlimiting example, the current density may be 5 mA/g or less. In stage 2, in addition to more pillaring ions being intercalated, the polyatomic or multivalent ions in the electrolyte, e.g. $MgCl^+$, may be able to intercalated into the host due to the opening up of the van der Waals gap, which results further increase in the interlayer distance. In some embodiments, layered materials of stage 2 may be subjected to activation at low current density for a predetermined amount of time corresponding to the second stage change. As a nonlimiting example, the current density may be 5 mA/g or less. In stage 3, more pillaring ions and/or polyatomic or multivalent ions in the electrolyte (e.g. $MgCl^+$) are intercalated and may be reduced to form a solid-electrolyte interphase (SEI) layer to fill the van der Waals gap. In some embodiments, layered materials of stage 3 may be subjected to activation at low current density for a predetermined amount of time corresponding to the third stage change. As a nonlimiting example, the current density may be 5 mA/g or less. Once stage 3 is reached, the activation process may be considered to be completed. The transition from stage 3 to stage 4 is the regular charging process, $MgCl^+$ are deintercalated from the gap leaving the pillaring ions remained in the gap. However, the interlayer distance would not decrease. For the discharging process, stage 4 goes back to stage 3. It is preferable to have the step from stage 2 to stage 3, which enables a stable transformation of the layered structure into high capacity electrode. Without this step, the specific capacity of the electrode is less than 100 mAh/g.

In some embodiments, the electrodes may demonstrate a specific capacity of 120 mAh/g or greater. In some embodiments, the electrodes may demonstrate a specific capacity of 150 mAh/g or greater. In some embodiments, the electrodes may demonstrate a specific capacity of 200 mAh/g or greater. In some embodiments, the electrodes may demonstrate a specific capacity of 250 mAh/g or greater. In some embodiments, the interlayer spacing of 2D material relative to a pristine sample may be 50% larger or more. In some embodiments, the interlayer spacing of 2D material relative to a pristine sample may be 100% larger or more. In some embodiments, the interlayer spacing of 2D material relative to a pristine sample may be 150% to 250% larger or more. In some embodiments, the interlayer spacing of 2D material relative to a pristine sample may be 200% larger or more. In comparison, pervious methods only increase the interlayer spacing less than 10%. In one embodiment, a $TiS_2$ electrode was activated with 1-butyl-1methylpyrrolidinium chloride (PY14Cl) added all phenyl complex (APC) electrolyte electrochemically. After activation, the electrode demonstrated 270 mAh/g specific capacity with excellent rate performance. In the other embodiment, a $MoS_2$ electrode was activated in the same procedure and demonstrated 280 mAh/g. In some embodiments, $MgCl^+$ is identified as the Mg storage carrier, which allows for a significantly reduced diffusion barrier to realize high specific capacity and charge-discharge rates.

Experimental Example

The following examples are included to demonstrate particular aspects of the present disclosure. It should be appreciated by those of ordinary skill in the art that the methods described in the examples that follow merely represent illustrative embodiments of the disclosure. Those of ordinary skill in the art should, in light of the present disclosure, appreciate that many changes can be made in the specific embodiments described and still obtain a like or similar result without departing from the spirit and scope of the present disclosure.

Electrochemical Activation of $1T-TiS_2$ for MgCl-Ion Storage

Figure 3:
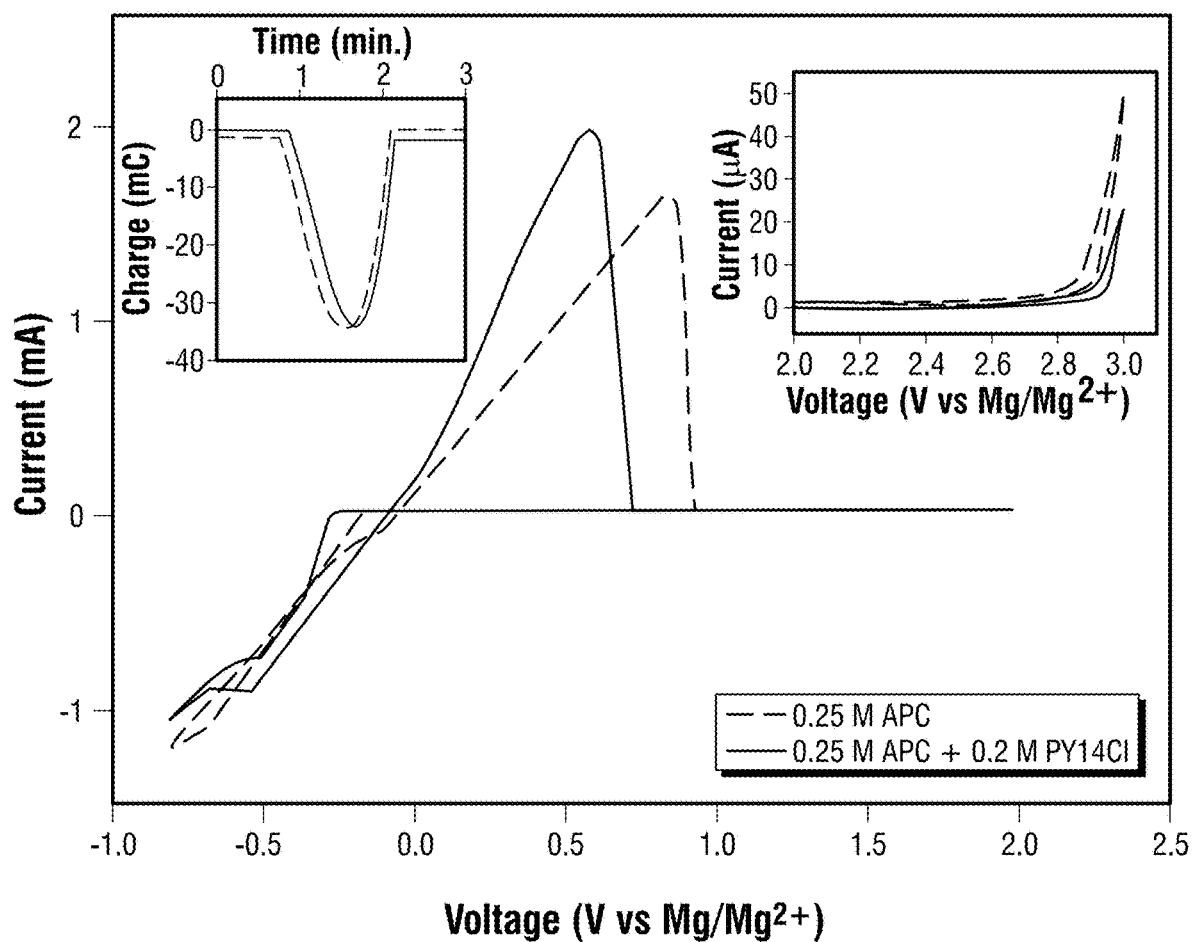
FIG. 3 shows the cyclic voltammograms of APC electrolytes with or without PY14Cl.

It is known that intercalating organic molecules or bulky ions can expand the layered materials by 10-60 Å. 1-butyl-1-methylpyrrolidinium ion ($PY14^+$) was chosen as the pillaring material to expand $TiS_2$ because of the bulky size and electrochemical stability of $PY14^+$. 0.2 M PY14Cl is dissolved into a standard all-phenyl complex (APC) electrolyte. Cyclic voltammetry characterization of the mixed electrolyte reveals a small increase in overpotential for Mg deposition and a small drop in the Coulombic efficiency compared to the pure APC electrolyte (Table 3). FIG. 3 show the cyclic voltammetry of APC electrolytes with or without PY14Cl. A platinum wire and magnesium foil were used as the working and counter electrodes, respectively. Voltage was scanned with the speed of 25 mV $s^{-1}$. The APC electrolytes with or PY14Cl small increase in overpotential for Mg deposition from 155 to 266 mV and a slight drop in Coulombic efficiency from 100% to 95.2%.

TABLE 3

Electrochemical performance of Mg-ion electrolyte with and without PY14Cl additive

| | Voltage window (V) | Overpotential for Mg deposition (V) | Coulombic efficiency (%) |
|---|---|---|---|
| APC | 2.6 | 0.155 | 100.0 |
| APC + 0.2M PY14Cl | 2.8 | 0.266 | 95.2 |

Figure 4:
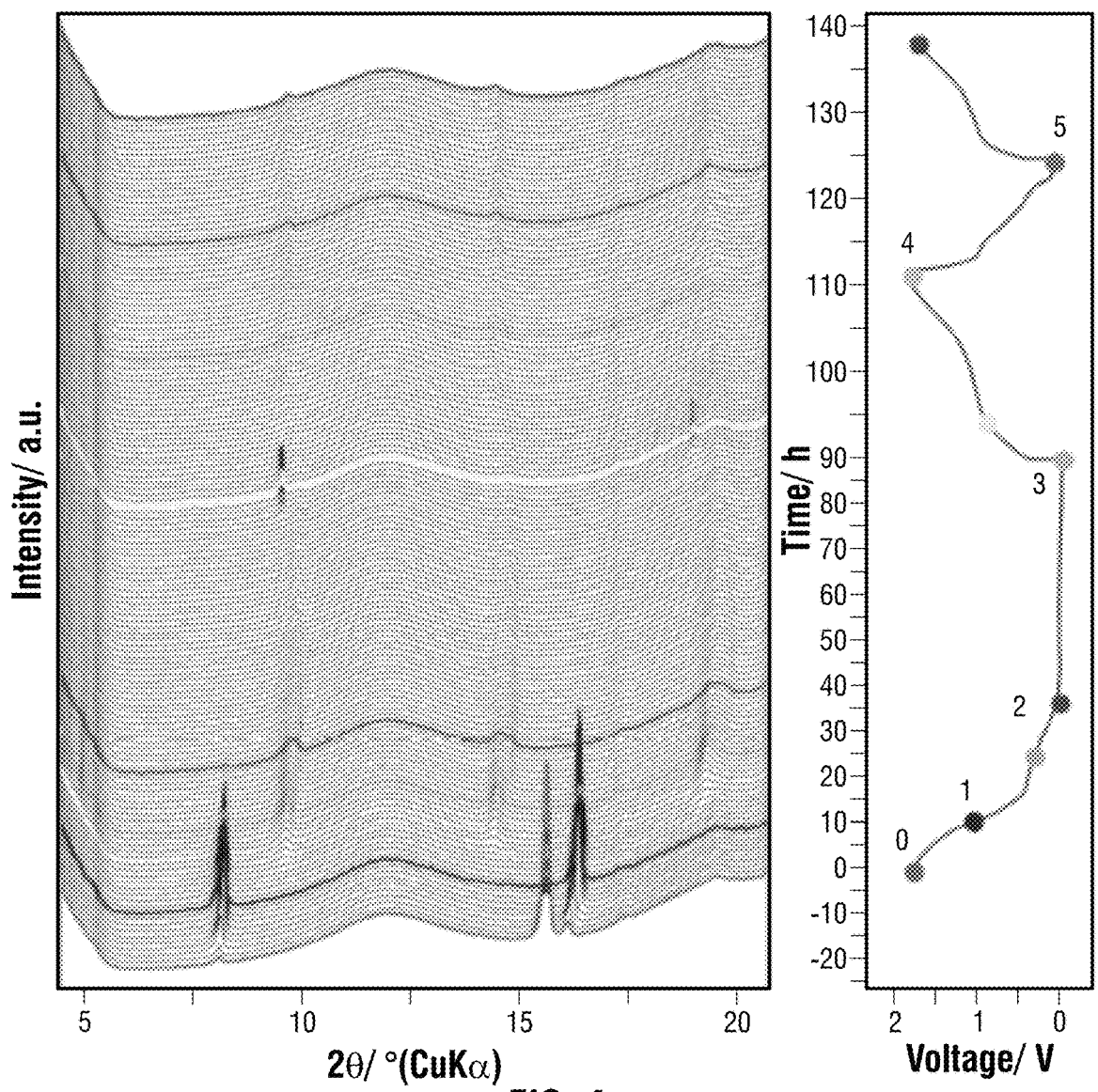
FIG. 4 shows in operando XRD characterization and corresponding galvanostatic voltage profile.
Figure 5:
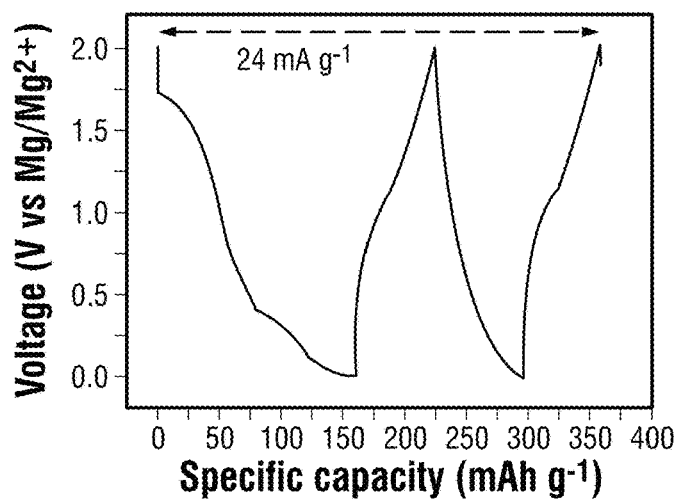
FIG. 5 shows the galvanostatic voltage profile of an expanded $TiS_2$ electrode with a current density of 24 mA/g.

To enable $MgCl^+$ intercalation in $TiS_2$, an electrochemical activation step is required to expand the interlayer spacing of two-dimensional $TiS_2$ assisted by $PY14^+$ ions. As shown from stage 0 to 3 in FIG. 4, the activation process was completed in the first discharge at low current density of 5 mA $g^{-1}$ for ~100 hours. When the activation is completed, the MRB shows a reversible capacity as high as 270 mAh $g^{-1}$ at 24 mA $g^{-1}$ (FIG. 4, stage 3 to 5), which is 1350% as large as the capacity of pristine $TiS_2$ (20 mAh $g^{-1}$).[23] Note that this activation step is a kinetically sluggish process. If conducted at a higher current density (24 mA $g^{-1}$), the long plateau between stages 2 to 3 would be absent and the incomplete activation leads to low reversible capacity of merely ~60 mAh $g^{-1}$ (FIG. 5 shows the galvanostatic voltage profile of an expanded $TiS_2$ electrode without the activation process at 0 V. Incomplete activation leads to low reversible capacity of 60 mAh $g^{-1}$).

Figure 6:
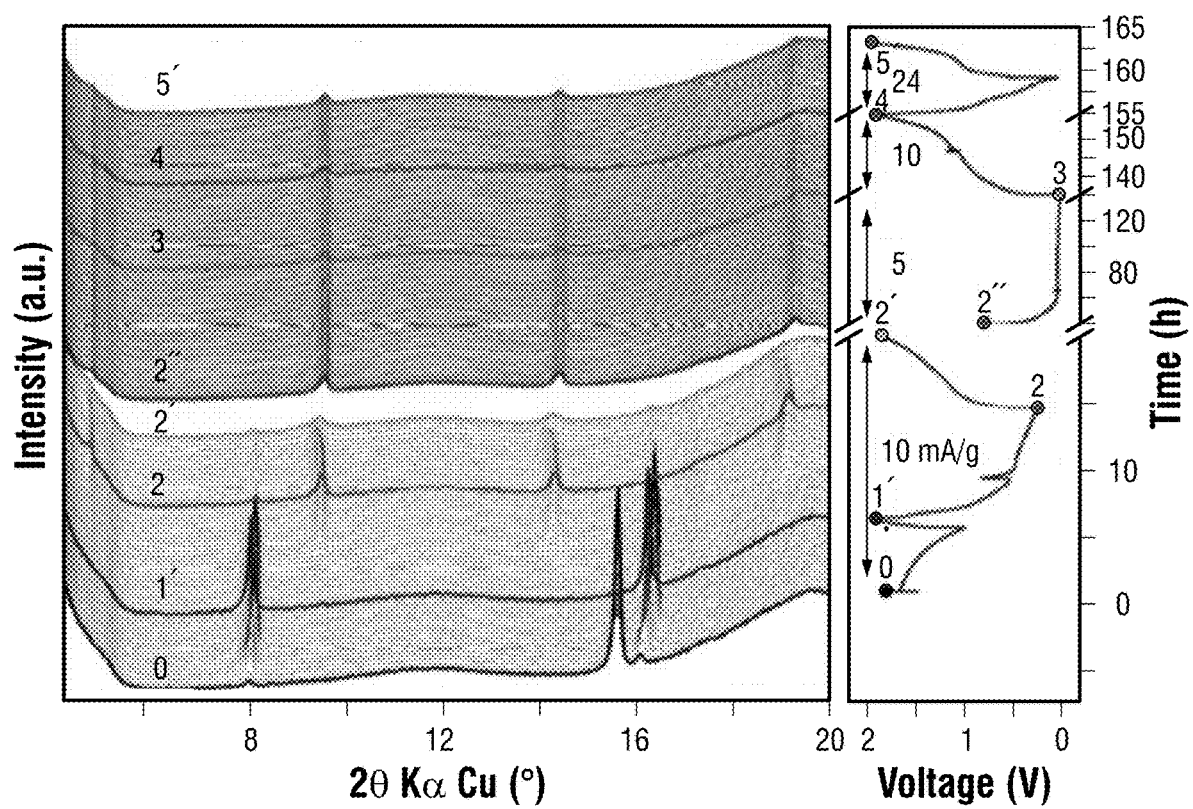
FIG. 6 shows another set of in operando XRD patterns to check the structural irreversibility of each stage 1, 2, and 3.
Figure 7:
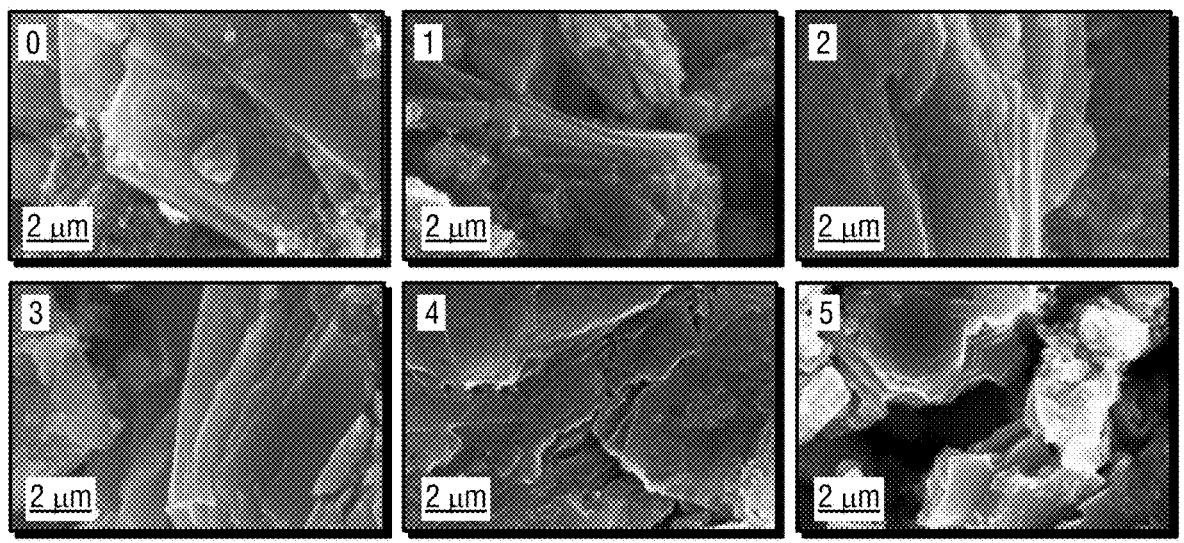
FIG. 7 shows SEM images of expanded $TiS_2$ at different stages (0-5) on the discharge curve in FIG. 5.

To shed light on the structural evolution of $TiS_2$ during the activation, we conducted in-operando X-ray diffraction (XRD) measurement. The configuration of an in-operando cell is shown in FIG. 4. An Mg metal anode was placed on the Be window to avoid electrochemical dissolution of Be metal. Centre of Mg metal was punched out to enhance the intensity of X-ray that reaches to and returns from $TiS_2$. X-ray diffraction patterns were scanned by D/teX Ultra 250 detector from 2θ=3° to 40° with step size of 0.04° and scanning speed of 1° or 2° per minute under Bragg-Brentano focusing. Cu Kα radiation was used and the voltage and current was 40 kV and 44 mA, respectively. Since beryllium metal undergoes electrochemical reaction with $TiS_2$ electrode in APC electrolyte, we placed Mg foil anode on the Be window and TiS$_2$ electrode under the Mg foil separated by a PP/PE/PP separator. In this configuration, Mg acts as sacrificial anode and Be is kept as Be$^0$ because of ca. 0.53 V higher standard electrode potential. This configuration has been used before to measure in operando XRD of high voltage Li-ion cathode. XRD spectra (FIG. 4) shows a peak at 15.56° for as-fabricated cell (stage 0), corresponding to the pristine TiS$_2$ (001) plane with c=5.69 Å. When discharging to 1.0 V vs Mg/Mg$^{2+}$ (stage 1), new peaks evolve at 8.13° and 16.31°, corresponding to (001) and (002) planes with c=10.87 Å. Further discharging to 0.2 V vs Mg (stage 2) results in four new peaks at 4.74°, 9.49°, 14.26°, and 19.04°, corresponding (001) to (004) planes with c=18.63 Å. The structure transformation from stages 1 to 2 is irreversible. In other words, the structure does not return to the previous stage even charging back to 2.0 V vs Mg. FIG. 6 shows another set of in operando XRD patterns to check the structural irreversibility of each stage 1, 2, and 3. The discharge cut-off voltage was controlled to 1.0, 0.2, and 0.0 V followed by charging back to 2.0 V to confirm the structural irreversibility of each stage 1, 2, and 3. Note that complete 4.74° peak was detected in the diffraction pattern of stage 2 for this measurement. From stage 2 to 3, we could not identify any peak shift; instead, peak intensity is attenuated, suggesting structural disorder developed during the long voltage plateau. Beginning from stage 3, the TiS$_2$ layers retain its interlayer distance upon charge/discharge, and the electrodes remain compact without exfoliating into single layers. The calculated interlayer spacing for each stage is shown in Table 4.

TABLE 4

Interlayer spacing calculated from in operando XRD patterns using Bragg's formula

| Stage | 2θ (°) Measured | 2θ (°) Corrected | Interlayer distance/Å | n in (00n) |
|---|---|---|---|---|
| 0 | 15.64 | 15.56 | 5.69 | 1 |
| 1 | 8.21 | 8.13 | 10.87 | 1 |
|   | 16.39 | 16.31 | 10.86 | 2 |
| 2, 3, 4, 5 | 4.82 | 4.74 | 18.63 | 1 |
|   | 9.57 | 9.49 | 18.62 | 2 |
|   | 14.34 | 14.26 | 18.63 | 3 |
|   | 19.12 | 19.04 | 18.64 | 4 |

Figure 8:
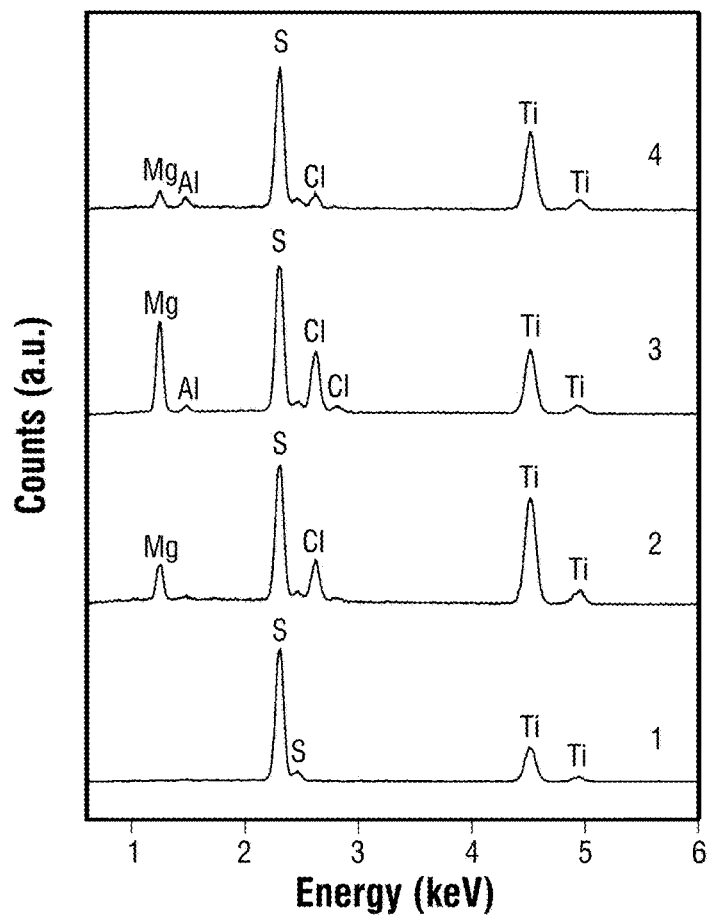
FIG. 8 shows EDS spectra for stage 1 to 4 and XPS spectra of MG2s, Cl2p and N1s for stage 0 to 5.
Figure 9:
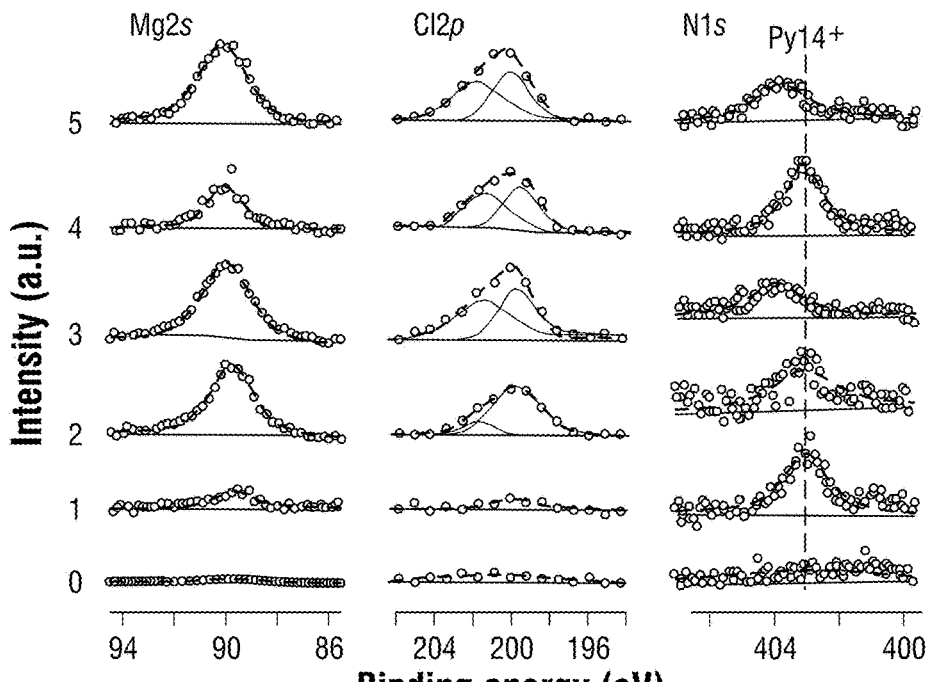
FIG. 9 shows XPS spectra of MG2s, Cl2p and N1s for stage 0 to 5.

The nature of intercalating species is investigated further by combining a variety of tools including energy dispersive spectroscopy (EDS), X-ray photoelectron spectroscopy (XPS), near-edge X-ray absorption fine structure (NEXAFS), inductively coupled plasma-optical emission spectroscopy (ICP-OES), electron energy loss spectroscopy (EELS), and nuclear magnetic resonance ($^1$H-NMR). First, the EDS and XPS spectra (FIG. 8-9) reveal a simultaneous increase in the peak intensity of Mg and Cl from stage 2 to 3 and then a simultaneous decrease from stage 3 to 4. The atomic ratio of Mg to Cl calculated from the EDS results at each stage is 1.0±0.2.

Figure 10:
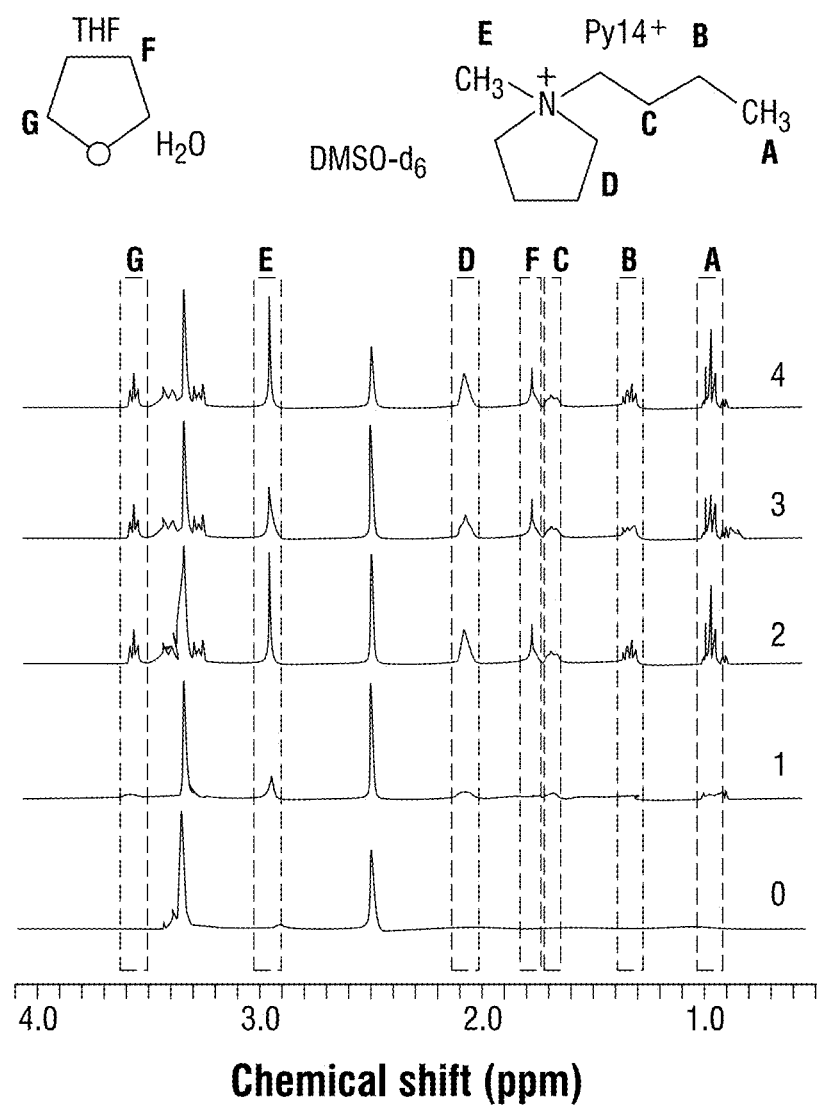
FIG. 10 shows NMR spectra of samples after sonication and heating in DMSO-$d_6$ solutions.

FIG. 10 shows NMR spectra of samples after sonication and heating in DMSO-d$_6$ solutions. Chemical shifts at boxes A, B, C, D, and E represent the proton of PY14$^+$ ion, while those at boxes F and G represent the proton of THF solvent. Chemical shift at 2.5 ppm and 3.4 ppm correspond to DMSO-d$_6$ and H$_2$O, respectively. Stage 0 shows negligible amount of PY14$^+$ and THF. Note that the sample at stage 0 was deliberately dipped in PY14$^+$ containing Mg-ion electrolyte and then rinsed with the same washing condition as the samples at stages 1-4. That means the PY14$^+$ and THF signal at stages 1-4 does not come from the trace amount of salt or solvents that can be possibly remained after washing. Combining the $^1$H-NMR and electrochemical results, only a small amount of THF molecules (~0.5-0.6 per one MgCl$^+$ ion) in the activated TiS$_2$ electrode were found. Such small amount of THF is much lower than the three THF molecules observed in tetra-coordinated solvation (MgCl$^+$·3THF), therefore excluding the solvation effect as the dominant performance enhancement factor.

Figure 11A:
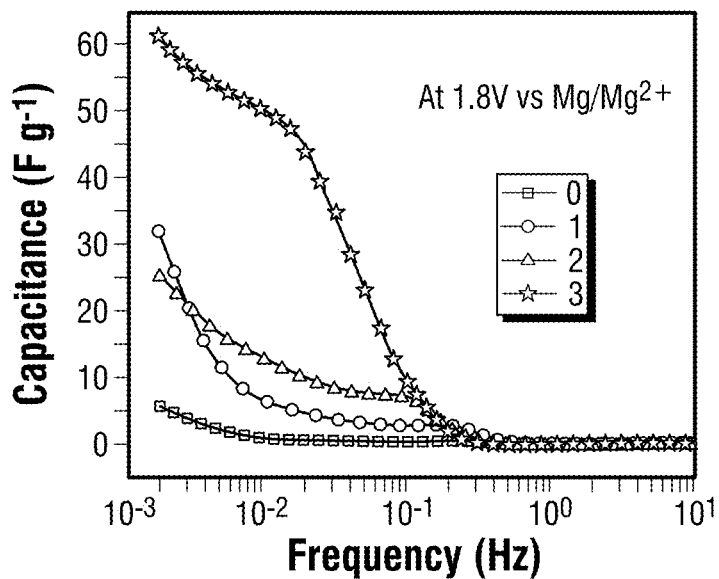
FIGS. 11a-11b show impedance analysis of $TiS_2$ electrode at different stages of electrochemical activation, more particularly (a) a capacitance vs frequency plot and (b) Nyquist plot.
Figure 11B:
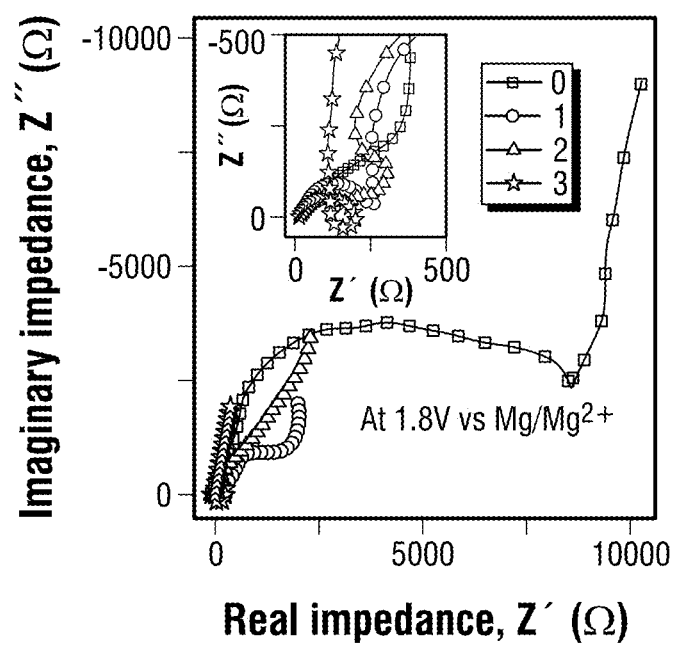

FIGS. 11a-11b show impedance analysis of TiS$_2$ electrode at different stages of electrochemical activation. Impedance was measured by 3-electrode cell at fixed potential of 1.8 V vs Mg/Mg$^{2+}$ with 0.2 M PY14Cl in APC electrolyte. FIG. 11a shows a capacitance vs frequency plot. The increase in capacitance as stage 3 corresponds to large interfacial area than stage 1 and 2. FIG. 11b shows a Nyquist plot. The impedance results show that the charge transfer impedance greatly reduced during the electrochemical activation step. Following the discharging step, PY14$^+$ will stay inside the van der Waals gap, while highly mobile MgCl$^+$ can intercalate reversibly during electrochemical cycling.

Electrochemistry of MRBs with MgCl$^+$ Intercalation

Figure 12A:
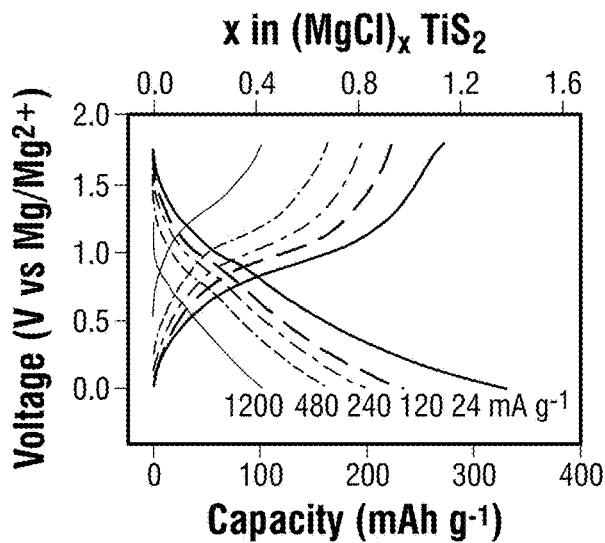
FIG. 12a-12f show electrochemical performances of electrochemically activated $TiS_2$. (a) Galvanostatic voltage profiles of activated $TiS_2$ electrode at various C-rate. The number of $MgCl^+$ intercalation per $TiS_2$ is also shown in the top axis. (b) A linear relationship between the peak current in cyclic voltammogram and the square root of the scan rate that is characteristic of diffusion limited mechanism. (c) Comparison of diffusivity calculated from GITT of activated $TiS_2$ with pristine $TiS_2$, pristine $MoS_2$, and peo-$MoS_2$ (ref. 44). (d) Specific capacity at different C-rate for the electrochemically activated $TiS_2$ compared to other $Mg^{2+}$ ion storage materials in the full cells with Mg metal anode at 25° C. (e) Cycling performance at 1C. The dip in capacity curve indicates a decrease of room temperature due to the HVAC malfunction. (f) Voltage profiles of activated $TiS_2$ electrode in pure APC electrolyte without $PY14^+$ ions, compared with that of the pristine $TiS_2$ electrode.

After investigating the activation step, the electrochemical performance of the activated TiS$_2$ MRBs is studied. FIG. 12a shows excellent rate performance with high reversible capacity of 272 mAh g$^{-1}$ at 0.1C (24 mA g$^{-1}$), 194 mAh g$^{-1}$ at 1C (240 mA g$^{-1}$), and 162 mAh g$^{-1}$ at 2C (480 mA g$^{-1}$), which correspond to 1.14, 0.81 and 0.68 MgCl$^+$ intercalation per formula of TiS$_2$, respectively. More than one MgCl$^+$ intercalation per TiS$_2$ formula unit is due to the creation of additional accessible sites by expanding TiS$_2$ gallery. The typical discharging voltage profiles possess a sloping profile, which is related to the one phase reaction of forming MgCl$_x$(TiS$_2$). This sloping shape of the voltage profile coincides with the theoretical calculation for Mg$^{2+}$ intercalation into layered TiS$_2$, but with lower voltage than expected. The decreased voltage is related with the weaker interaction between MgCl$^+$ ion and expanded TiS$_2$ that leads to smaller formation energy.

Figure 12B:
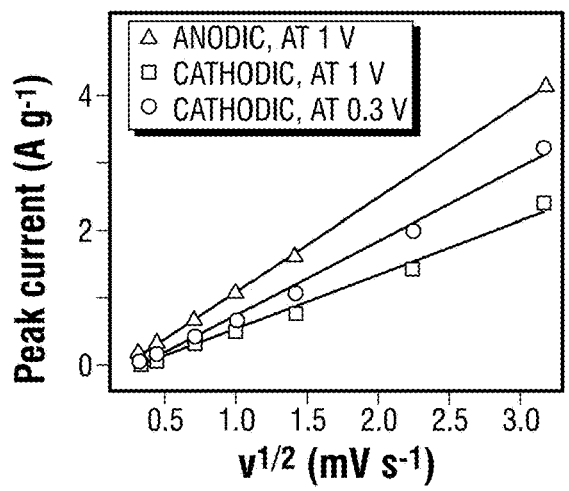
Figure 12C:
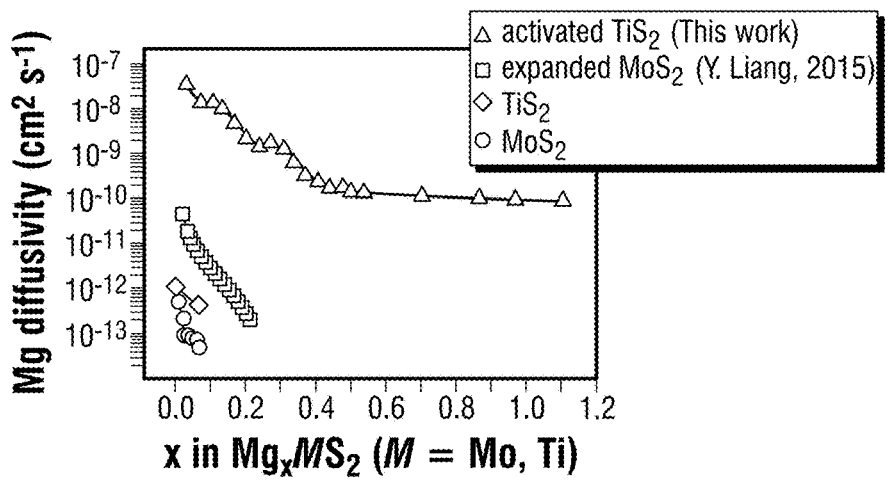

To confirm the mechanism is indeed intercalation rather than adsorption, cycling voltammetry (CV) was measured at scan rate (v) from 0.1 to 10 mV s$^{-1}$. FIG. 13 shows cyclic voltammogram of expanded TiS$_2$ at varied scan rates from 0.1 to 10 mV s$^{-1}$. The vertical axis shows current normalized by scan rate. FIG. 12b shows the linear relationship between peak current versus v$^{1/2}$, indicating the diffusion-limited intercalation mechanism rather than a capacitance effect. Galvanostatic intermittent titration technique (GITT) was also used to determine ion diffusivity as a function of depth-of-discharge and the composition-dependent electrode kinetics. FIG. 12 shows galvanostatic intermittent titration curve of an activated TiS$_2$ electrode. The CV and GITT studies were carried out with a three-electrode coin cell. FIG. 13 shows a schematic of a three-electrode coin cell. Ring-shaped Mg metal foil was used as a reference electrode without blocking the working and counter electrodes. The reference electrode was connected out of the coin cell by polypropylene-coated stainless steel foil (50 µm and 350 µm thick before and after coating, respectively). Vacuum grease was applied on the joint for hermetic sealing of the cell. The three-electrode arrangement was used because a two-electrode configuration could obscure the true cathode potential due to the overpotential of Mg at the anode. FIG. 12c shows the average diffusivity of 10$^{-9}$ cm$^2$ s$^{-1}$ for the activated TiS$_2$. The Mg diffusivity is initially high at the level of 2×10$^{-8}$ cm$^2$ s$^{-1}$ but decreases with increasing Mg concentration, and then stays constant as $10^{-10}$ cm$^2$ s$^{-1}$ towards the end of process. In comparison, pristine TiS$_2$, pristine MoS$_2$, and PEO-expanded MoS$_2$ exhibit average Mg diffusivity of $10^{-12}$ to $10^{-13}$ cm$^2$ s$^{-1}$, which is two to three orders of magnitude lower than the Mg diffusivity in activated TiS$_2$.

Figure 12D:
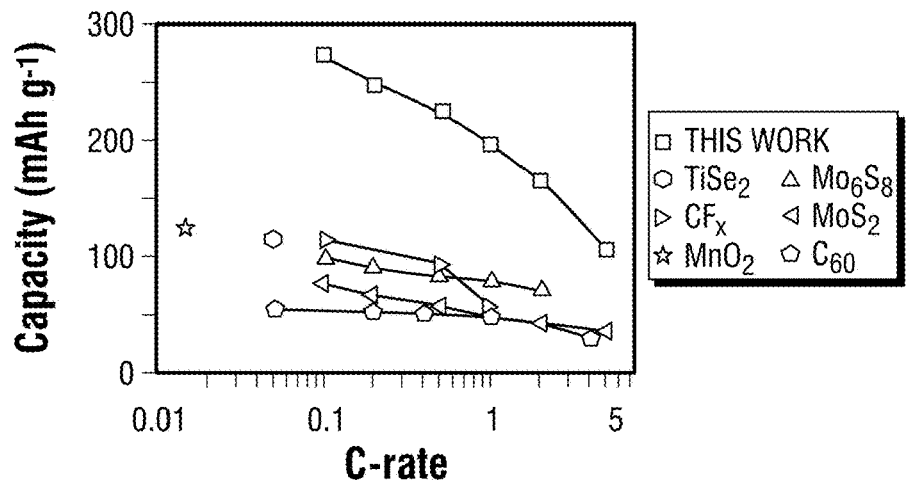
Figure 12E:
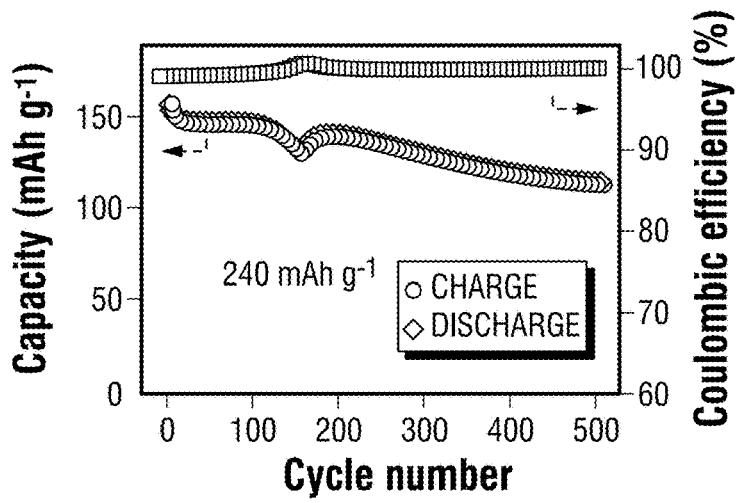
Figure 12F:
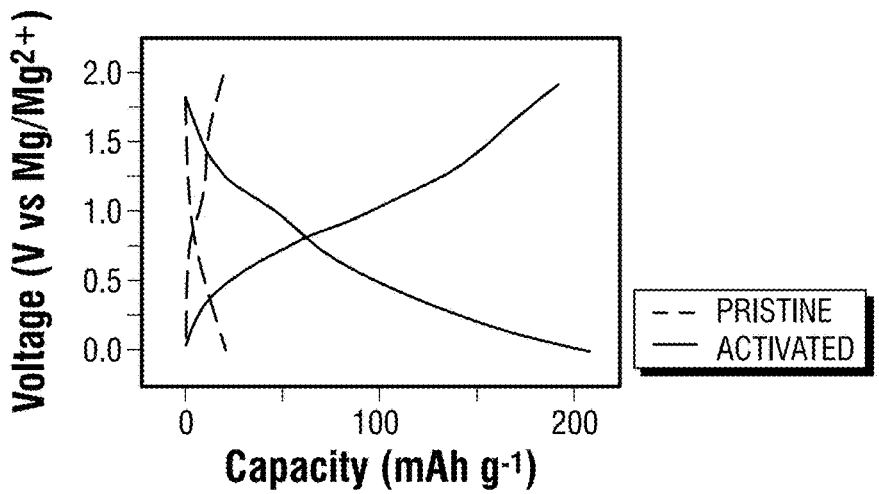
Figure 13:
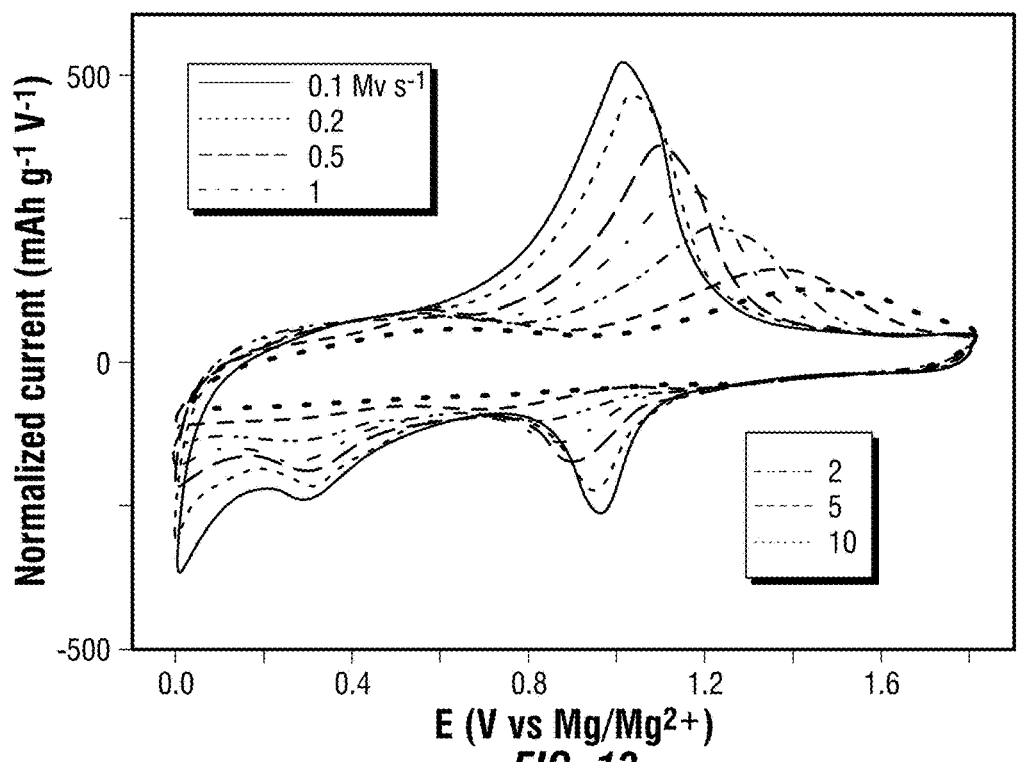
FIG. 13 shows a cyclic voltammogram of expanded $TiS_2$ at varied scan rates from 0.1 to 10 mV $s^{-1}$. The vertical axis shows current normalized by scan rate.
Figure 14A:
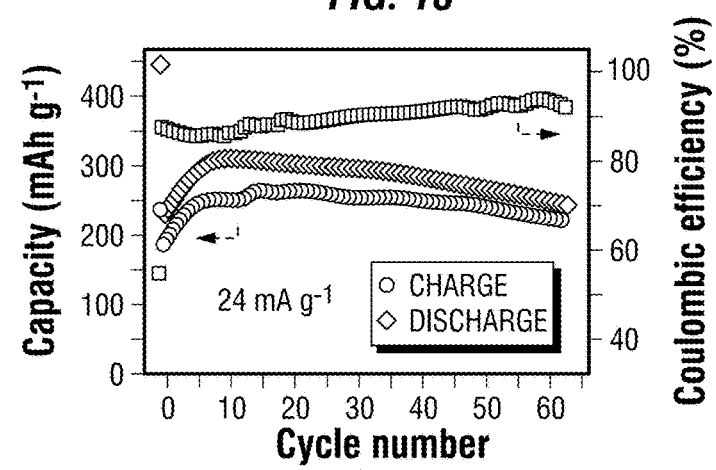
FIGS. 14a-14b respectively show (a) cycling stability of activated $TiS_2$|Mg cell at 24 mA $g^{-1}$ (1C-rate) in 0.25 M APC electrolyte that contains 0.2 M $PY14^+$ ion, and (b) voltage profiles of the $TiS_2$.
Figure 14B:
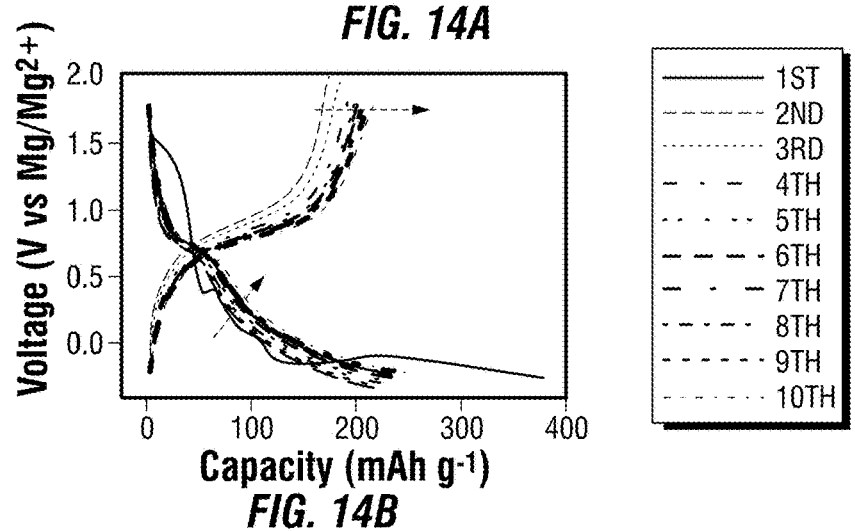
Figure 15A:
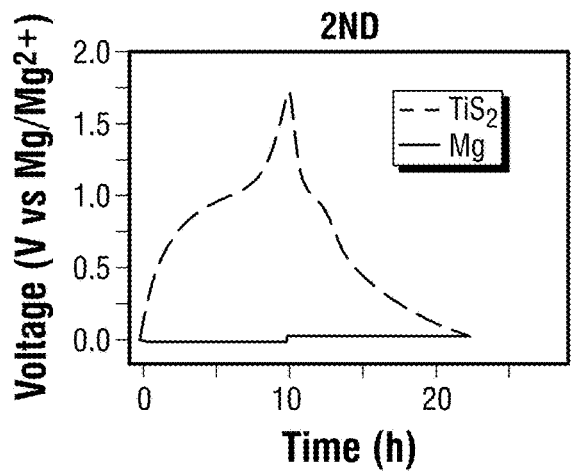
FIGS. 15a-15d respectively show voltage profiles of layered $TiS_2$ cathode (dotted) and Mg anode (solid) measured simultaneously in a three-electrode cell vs a Mg/$Mg^{2+}$ reference electrode at the $2^{nd}$, $13^{rd}$, $80^{th}$ and $137^{th}$ cycle.
Figure 15B:
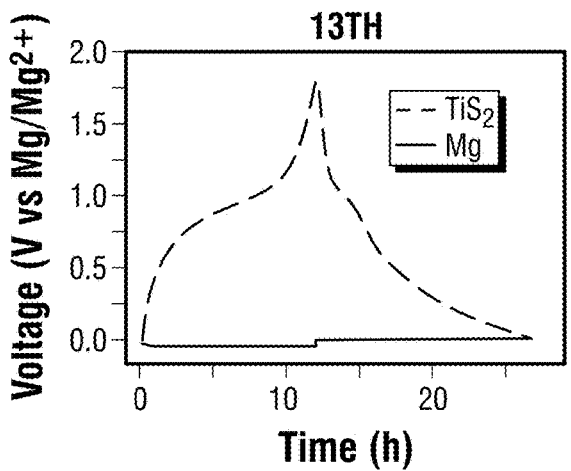
Figure 15C:
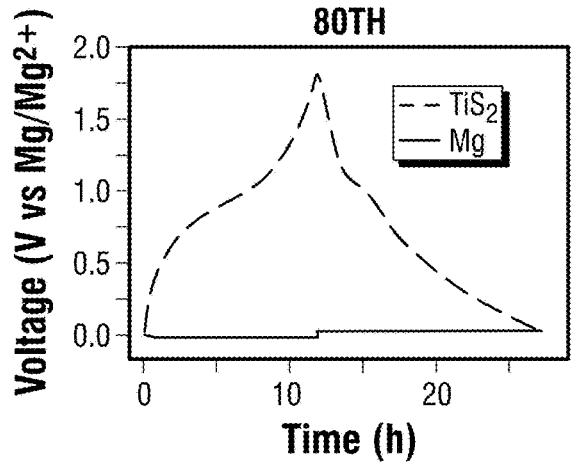
Figure 15D:
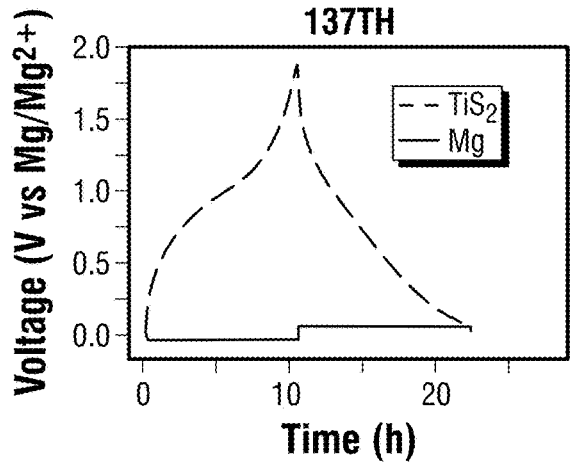

FIG. 12d shows outstanding specific capacity and rate capability of activated TiS$_2$ compared to other Mg-ion storage materials in the full cells with Mg metal anode at 25° C. In terms of cycling stability in FIG. 12e, the activated TiS$_2$ electrode exhibits 80% capacity retention after 500 cycles at 1C-rate (240 mA g$^{-1}$). The Coulombic efficiency is consistently higher than 98%. At 0.1 C-rate (24 mA g$^{-1}$), the cell retains 89% of initial capacity after 50 cycles; and the reversible capacity increases from 200 mAh g$^{-1}$ to 270 mAh g$^{-1}$ during initial 10 cycles due to the activation progresses. FIGS. 14a-14b show (a) cycling stability of activated TiS$_2$|Mg cell at 24 mA g$^{-1}$ (1C-rate) in 0.25 M APC electrolyte that contains 0.2 M PY14$^+$ ion; and (b) voltage profiles of the TiS$_2$|Mg cell for initial 10 cycles. Future examination can clarify the capacity decay mechanism and improve cycling stability using functional binders (e.g., poly(acrylic acid) or carboxymethyl cellulose) that are effective for electrodes with volume change during the activation step. For practical concern, the electrodes reported here have an areal capacity of 1.4 mAh cm$^2$, which could be further increased by downsizing the TiS$_2$ particles for faster activation of the electrode. The activated material at stage 4 (i.e. completely de-intercalated) was transferred into a new cell with a standard APC electrolyte solution without PY14+ (FIG. 12f). The performance is largely retained with the reversible capacity of about 200 mAh g$^{-1}$, which proves the genuine MgCl$^+$ intercalation in the activated TiS$_2$ electrode. The smaller capacity compared to the original cell is most likely due to the inevitable material loss during washing and transferring the electrode.

The proposed electrochemical reactions in the cell could be summarized in following equations:

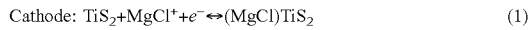

Cathode: TiS$_2$+MgCl$^+$+e$^-$↔(MgCl)TiS$_2$ (1)

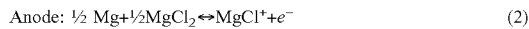

Anode: ½ Mg+½MgCl$_2$↔MgCl$^+$+e$^-$ (2)

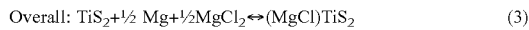

Overall: TiS$_2$+½ Mg+½MgCl$_2$↔(MgCl)TiS$_2$ (3)

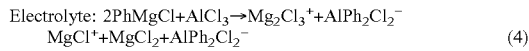

Electrolyte: 2PhMgCl+AlCl$_3$→Mg$_2$Cl$_3^+$+AlPh$_2$Cl$_2^-$
MgCl$^+$+MgCl$_2$+AlPh$_2$Cl$_2^-$ (4)

During the discharge, Equation 1 describes the intercalation of MgCl$^+$ into the activated TiS$_2$ in the cathode. Equation 2 describes the simultaneous generation of MgCl$^+$ at the Mg anode by converting from MgCl$_2$ species in APC electrolyte due to the dynamic equilibrium among those species (Equation 4). Therefore, MgCl$_2$ are consumed form or replenished into the electrolyte during the electrochemical cycling (Equation 3). Thus the energy density of the present cell is limited by the solubility of MgCl$_2$ in THF. It has been previously demonstrated the solubility of MgCl$_2$ can increase dramatically if the Cl$^-$ acceptors are present in solution. Although we recognize the chemical composition of the original APC electrolyte (PhMgCl: AlCl$_3$=2:1) will change to (Ph$_2$Mg:AlCl$_3$=1:1) during the discharge when MgCl$_2$ is consumed, it is argued such compositional change will still allow reversible Mg-deposition and stripping supported by our experimental data in FIG. 15a-15d showing voltage profiles of layered TiS$_2$ cathode (dotted) and Mg anode (solid) measured simultaneously in a three-electrode cell vs a Mg/Mg$^{2+}$ reference electrode at the 2$^{nd}$, 13$^{rd}$, 80$^{th}$ and 137$^{th}$ cycle. The electrochemical voltage profiles of the Mg anode at the 2$^{nd}$, 13$^{rd}$, 80$^{th}$ and 137$^{th}$ cycles reflect minimum change during the prolonged electrochemical cycling.

Figure 16:
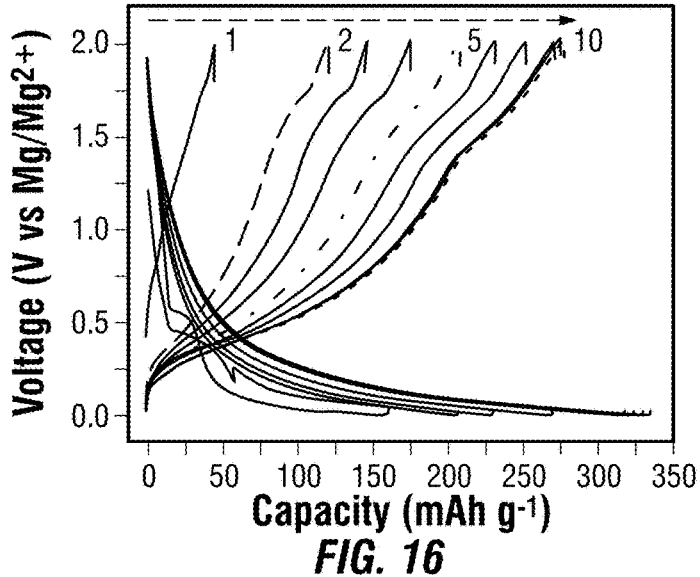
FIG. 16 shows a voltage profile of electrochemical activation of $MoS_2$ in 0.2 M PY14Cl+APC electrolyte at 17 mA $g^{-1}$.

The MgCl-ion storage mechanism can be generalized to other two-dimensional materials. For example, molybdenum disulphide (MoS$_2$) also demonstrated ~270 mAh g$^{-1}$ after 10 cycles in the APC-PY14Cl mixed electrolyte. FIG. 16 shows voltage profile of electrochemical activation of MoS$_2$ in 0.2 M PY14Cl+APC electrolyte at 17 mA g$^{-1}$. The reversible capacity increases with cycling and reaches the maximum value of 270 mAh g$^{-1}$ after 10 cycles.

In summary, a novel MRB enabled by a monovalent MgCl$^+$ storage mechanism. A class of two-dimensional host materials that are electrochemically activated to expand the interlayer spacing significantly over its pristine value to accommodate the large MgCl$^+$. With the activated cathode, the reversible capacity and rate performance of a multivalent/polyatomic-ion battery surpass the state-of-the-art MRB. Most importantly, a new direction is identified towards overcoming the challenge of high migration energy barrier in multivalent/polyatomic-ion batteries. This work has general implications for multivalent cathode design, as well as the unique advantage of adapting two-dimensional materials for advanced energy storage. These batteries are a promising technique for the pursuit of ultra-high-density energy storage which will deliver over four times higher volumetric energy densities than those of state-of-the-art lithium-ion batteries. The intrinsic safety of these batteries adds to the flexibility in packaging battery system for electric vehicles. The system and method is a departure from currently available technology and represents a significant change in the performance of the current state-of-the-art energy storage solutions for distributed power source, grid, and EV applications.

Material preparation. Layered TiS$_2$ (99.8%, Strem Chemical Inc.) was used as purchased. TiS$_2$ powders have an average particle size of 10 μm. A slurry of active material (70 wt. %), Super-P carbon (20 wt. %), and polyvinylidene fluoride (10 wt. %) dispersed in N-methyl-2-pyrrolidone was spread on a piece of stainless steel mesh (400 mesh, 0.8 cm$^2$) and dried as the working electrode with active material mass loading of 0.5-1.0 mg cm$^{-2}$. To prepare samples for analysis, we prepared electrode by cold pressing 7 mg of TiS$_2$ powders onto stainless steel mesh at 10 MPa without using binder or conductive agent. Freshly polished magnesium foil (50 μm thick, 99.95%, GalliumSource, LLC) was used as both the counter and reference electrodes in 2- or 3-electrode cell test. Standard all-phenyl complex (APC) electrolyte, a solution of 0.25 M [Mg$_2$Cl$_3$]$^+$[AlPh$_2$Cl$_2$]$^-$ in tetrahydrofuran (THF, Acros Co.), was prepared following D. Aurbach et al. as the Mg-ion electrolyte. 0.2 M 1-butyl-1-methylpyrrolidinium chloride (PY14Cl, >98.0%, TCI America Co.) was mixed in the APC electrolyte.

Electrochemical testing. 2-Electrode coin cells and 3-electrode tube cells were fabricated in an Ar-filled glove box for electrochemical characterizations. For the coin cell configuration, the sequence is following: a magnesium foil anode, a glass fibre separator (210 μm thick, grade 691, VWR Co.), a tri-layer polypropylene/polyethylene/polypropylene (PP/PE/PP) separator (25 μm thick, Celgard 2325, Celgard LLC.), and a cathode. For the 3-electrode configuration, a ring-shaped magnesium foil was used as the reference electrode connected out of the coin cell by polypropylene coated stainless steel foil. The electrochemical characterizations were conducted using a potentiostat (VMP-3, Bio-Logic Co.) and battery cyclers (CT2001A, Lanhe Co.) using the mixture electrolyte conducted at room temperature.

Embodiments described herein are included to demonstrate particular aspects of the present disclosure. It should be appreciated by those of skill in the art that the embodiments described herein merely represent exemplary embodiments of the disclosure. Those of ordinary skill in the art should, in light of the present disclosure, appreciate that many changes can be made in the specific embodiments described and still obtain a like or similar result without departing from the spirit and scope of the present disclosure. From the foregoing description, one of ordinary skill in the art can easily ascertain the essential characteristics of this disclosure, and without departing from the spirit and scope thereof, can make various changes and modifications to adapt the disclosure to various usages and conditions. The embodiments described hereinabove are meant to be illustrative only and should not be taken as limiting of the scope of the disclosure.

What is claimed is:

1. An electrode for an ion battery comprising:
    a host material, wherein the host material is a two-dimensional, layered material selected from an elemental host material, metal, chalcogenide, metal oxide, oxy-halide, hydroxide, titanate, metal phosphate, or phosphonate;
    a pillaring salt, wherein the pillaring salt comprises a cation and an anion,
        wherein the cation is selected from the group consisting of imidazolium, pyridinium, ferrocenium, alkyl-ammonium, pyrrolidinium, and piperridinium, and
        wherein the anion is selected from the group consisting of $Cl^-$, $TFSI^-$, $BF_4^-$, and $AlCl_xR_{4-x}^-$;
    a solvent; and
    a polyatomic ion, wherein the polyatomic ion is selected from the group consisting of $MgCl^+$, $Mg_2Cl_3^+$, $Mg_2Cl_2^{2+}$, $AlCl_4^-$, and combinations thereof,
        wherein the pillaring salt, the solvent and the polyatomic ion are intercalated into a van der Waals gap of the host material,
        and
        wherein an interlayer spacing of the host material does not change during a charged stage and discharged stage.

2. The electrode of claim 1, wherein the host material is the elemental host material, and the elemental host material is selected from graphite or black-phosphorous.

3. The electrode of claim 1, wherein the host material is the metal, and the metal has a formula MX2, where M=Ti, Mo, V, W, Nb, Ta, Zr, or Hf and X=S or Se.

4. The electrode of claim 1, wherein the host material is the chalcogenide with a formula
    $(MS)_{1+x}(TS_2)_2$, where $0 \le x \le 1$, M=Sn, Pb, and T=Ti, Nb, Ta;
    $MPX_3$, where M=Mg, V, Mn, Fe, Co, Ni, Zn, Cd, or In and X=S or Se; or
    $AMS_2$, where A=Li, Na, K, Rb, Cs, or Fr and M=Ti, V, Cr, Mn, Fe, Co, or Ni.

5. The electrode of claim 1, wherein the host material is the metal oxide with a formula
    $M_xO_y$, where M=is a metal or a combination of metals that includes an alkali metal, and x and y are values determined by an oxidation state of M; or
    $MOXO_4$, where M=Ti, V, Cr, or Fe and X=P or As.

6. The electrode of claim 1, wherein the host material is the oxy-halide with a formula MOX, where M=Ti, V, Cr, or Fe and X=Cl or Br.

7. The electrode of claim 1, wherein the host material is the hydroxide or the titanate.

8. The electrode of claim 1, wherein the host material is the metal phosphate with a formula $M(HPO_4)_2$, where M=Ti, Zr, Ce, or Sn).

9. The electrode of claim 1, wherein the host material is the phosphonate with a formula $Zr(O_3PR_2)_2$, where R=H, Ph, or Me.

10. The electrode of claim 1, wherein the van der Waals gap of the host material is filled to a maximum in the discharged stage, and the polyatomic ion is deintercalated from the van der Waals gap in the charged stage.

11. The electrode of claim 1, wherein the interlayer spacing of the host material intercalated with a pillaring salt, a solvent, and a polyatomic ion is 50% larger or more relative to a non-intercalated host material.

12. The electrode of claim 1, wherein the electrode has a specific capacity of at least 240 mAh/g.

13. The electrode of claim 1, wherein the polyatomic ion comprises $MgCl^+$.

14. The electrode of claim 1, wherein the electrode is a cathode.

15. The electrode of claim 1, wherein the electrode is for a rechargeable magnesium battery.

16. The electrode of claim 1, wherein the solvent is a non-aqueous solvent.

17. The electrode of claim 16, wherein the non-aqueous solvent comprises tetrahydrofuran.

* * * * *